(12) United States Patent
Van Ham

(10) Patent No.: US 9,336,264 B2
(45) Date of Patent: *May 10, 2016

(54) COLLABORATIVE FILTERING OF A GRAPH

(71) Applicant: International Business Machines Corporation, Armonk, NY (US)

(72) Inventor: Frank Van Ham, Geldrop (NL)

(73) Assignee: International Business Machines Corporation, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/915,601

(22) Filed: Jun. 11, 2013

(65) Prior Publication Data

US 2014/0006421 A1    Jan. 2, 2014

Related U.S. Application Data

(63) Continuation of application No. 13/540,550, filed on Jul. 2, 2012.

(51) Int. Cl.
*G06F 17/30* (2006.01)
*G06F 7/00* (2006.01)
*H04L 12/64* (2006.01)

(52) U.S. Cl.
CPC .... *G06F 17/30386* (2013.01); *G06F 17/30867* (2013.01); *G06F 17/30958* (2013.01); *H04L 12/6418* (2013.01)

(58) Field of Classification Search
None
See application file for complete search history.

(56) References Cited

U.S. PATENT DOCUMENTS

| | | | |
|---|---|---|---|
| 6,108,311 A * | 8/2000 | Ramaswami et al. | 370/258 |
| 7,215,337 B2 | 5/2007 | Heer et al. | |
| 7,617,185 B2 | 11/2009 | Werner et al. | |
| 7,853,930 B2 | 12/2010 | Mitchell et al. | |
| 7,873,939 B2 | 1/2011 | Tian et al. | |
| 8,849,823 B2 * | 9/2014 | Gotz et al. | 707/736 |
| 2007/0033279 A1 * | 2/2007 | Battat et al. | 709/224 |
| 2008/0232389 A1 * | 9/2008 | Wu et al. | 370/436 |
| 2010/0071000 A1 * | 3/2010 | Amento et al. | 725/39 |
| 2011/0055379 A1 * | 3/2011 | Lin et al. | 709/224 |
| 2011/0191283 A1 * | 8/2011 | Voigt et al. | 706/54 |

* cited by examiner

*Primary Examiner* — Dung K Chau
(74) *Attorney, Agent, or Firm* — Steven M. Greenberg, Esq.; CRGO Law

(57) ABSTRACT

Embodiments of the present invention provide for collaborative filtering during retrieval of a graph. In an embodiment of the invention, a method for collaborative filtering of a graph includes loading a data set from a repository of data and representing the data set in a graph of a plurality of arranged nodes and links therebetween. A primary node can be identified amongst the nodes of the graph a composite rating can be retrieved for different ones of the arranged nodes. In this regard, the composite rating for a corresponding one of the nodes can include an aggregation of different ratings previously applied to the corresponding one of the nodes by different end users. Finally, a subset of the arranged nodes can be selected based upon the identified primary node and a composite rating of one or more other nodes.

10 Claims, 2 Drawing Sheets

COLLABORATIVE FILTERING OF A GRAPH

CROSS-REFERENCE TO RELATED APPLICATIONS

This application claims priority to U.S. patent application Ser. No. 13/540,550, currently pending, filed Jul. 2, 2012, the entirety of which are incorporated herein by reference.

BACKGROUND OF THE INVENTION

1. Field of the Invention

The present invention relates to graph visualization and more particularly to node filtering when visualizing a large graph.

2. Description of the Related Art

Interlinked data sources such as a graph, also known as a nodal network, are becoming increasingly important for data analytics. Finding unusual structural patterns, or particular combinations of node properties and connections can be vital in areas such as fraud analysis, network optimization, biotech or counter terrorism. Because of their complex nature, visualization of interlinked data sources such as graphs can be critical so as to derive useful information from the interlinked data sources. However, the complexity and size of modern day graphs preclude graphs from being visualized entirely with standard visualization techniques in a limited display space.

In this regard, complexity of a graph can be an important consideration because the number of links in most graphs is such that any item in the graph can be reached in an almost constant number of steps. Trying to manipulate and visualize a large graph with standard node-link based visualization techniques often results in the utilization of substantial memory and bandwidth to retrieve the large graph over a computer communications network, and also the dense, unreadable display of the large graph within a limited display space. To wit, in terms of size, graphs of over several million items are no longer the exception and gaining any amount of insight from exploration alone is a daunting task.

Conventional methods and apparatuses for displaying large graphs within a limited display space are well known. For example, it is known to logically zoom upon a directed graph such that the local structure around a target node can be more readily understood. Thus, it is known in the art, to emphasize within a limited display space only a node of determined interest along with nodes in its immediate logical neighborhood to the detriment of other, less interesting nodes in order to utilize limited display most efficiently for the benefit of the end user. Yet, most current display methodologies rely upon only displaying a contiguous portion of nodes in a large graph and consider only the circumstance where the graph is to be browsed by a single end user.

BRIEF SUMMARY OF THE INVENTION

Embodiments of the present invention address deficiencies of the art in respect to graph visualization and provide a novel and non-obvious method, system and computer program product for collaborative filtering of a graph. In an embodiment of the invention, a method for collaborative filtering of a graph includes loading a data set from a repository of data and storing the data set as a graph. The method also includes identifying a primary node of interest amongst the nodes of the graph and computing a composite rating for different ones of the stored nodes. In this regard, the composite rating for a corresponding one of the nodes can include an aggregation of different ratings previously applied to the corresponding one of the nodes by different end users at different timestamps. Finally the method can include selecting a subset of the stored nodes based upon the identified primary node and a composite rating of one or more other nodes and transmitting to a computer over a computer communications network only the identified node and the subset.

In one aspect of the embodiment, the subset is selected based upon one or more nodes amongst the subset having a rating indicative of high relevance to the different end users. Conversely, in another aspect of the embodiment, the subset is selected based upon one or more nodes amongst the subset having a rating indicative of previously underexplored portions of the graph. In even yet another aspect of the embodiment, the subset is selected based upon a topmost number of nodes of a threshold composite rating in the graph, reconstructed into a new arrangement with each of the nodes in the new arrangement being interconnected according to a computed relationship from the graph for each of the nodes of the new arrangement.

In another embodiment of the invention, a graph filtering data processing system can be configured for collaborative filtering during visualization of a graph. The system can include a computer with a display, memory and at least one processor communicatively coupled to a data repository over a computer communications network. The system also can include a collaborative filtering module executing in the memory of the computer. In operation, the module can load a data set from the repository, represent the data set in a graph structure, identify a primary node amongst the set of all nodes, retrieve a composite rating for different ones of the stored nodes, select a subset of the nodes based upon the identified primary node and a composite rating of one or more other nodes, and transmit to a computer over a computer communications network only the identified node and also the subset.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for collaborative filtering during retrieval and visualization of a graph. In accordance with an embodiment of the invention, a graph can be browsed by several different end users at different times and the different end users can individually rate different nodes of the graph. Thereafter, an aggregate rating can be computed for the different nodes based upon the individual ratings provided by the different end users. Subsequently, a portion of the graph can be selected for retrieval over a network by a requesting end user based upon the aggregate ratings. For example, a highly rated primary node and its surrounding nodes can be selected for retrieval on the basis that since others have found these nodes most interesting, one browsing the graph should view those highly rated nodes. Conversely, nodes that are proximate to a highly rated node can be excluded from retrieval on the basis that highly rated nodes have been exhaustively reviewed by other users and attention should be directed towards these other nodes of the graph.

Figure 1:
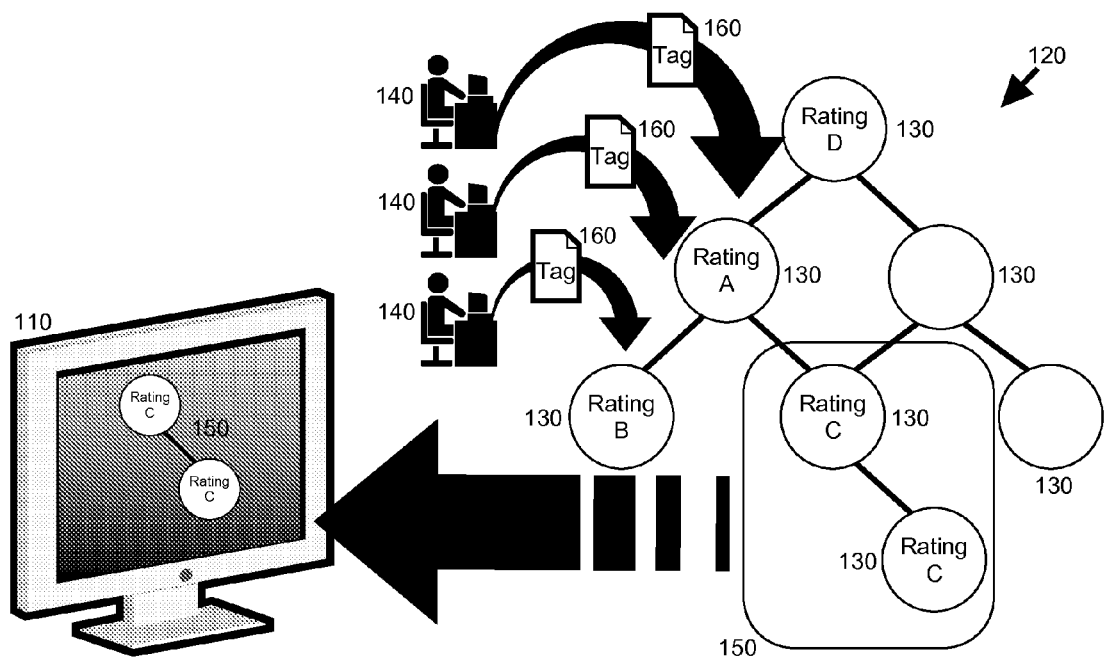
FIG. 1 is a pictorial illustration of a process for collaborative filtering of a graph.

In further illustration, FIG. 1 pictorially depicts a process for collaborative filtering of a graph. As shown in FIG. 1, different end users 140 can apply tags 160 rating different nodes 130 of a graph 120. Thereafter, an end user 140 can identify amongst the nodes 130 a node of interest and a subset 150 of the nodes 130 of the graph 120 can be produced by filtering the nodes 130 according to the tags 160 and the identified node. For example, the subset 150 can be produced by filtering the collection of all nodes 130 to just the ones connected to the node of interest that are rated as highly significant amongst the other nodes 130. Alternatively, the subset 150 can be produced by filtering nodes 130 that are either untagged, or tagged with a rating indicating a relative lack of interest or exploration. Once the subset 150 has been filtered from the graph 120, the subset 150 can be transmitted to the end user 140 over a computer communications network for display in a computer display 110. In this way, a large graph can be intelligently visualized within a limited display according to the collective, collaborative rating of the nodes of the graph.

Figure 2:
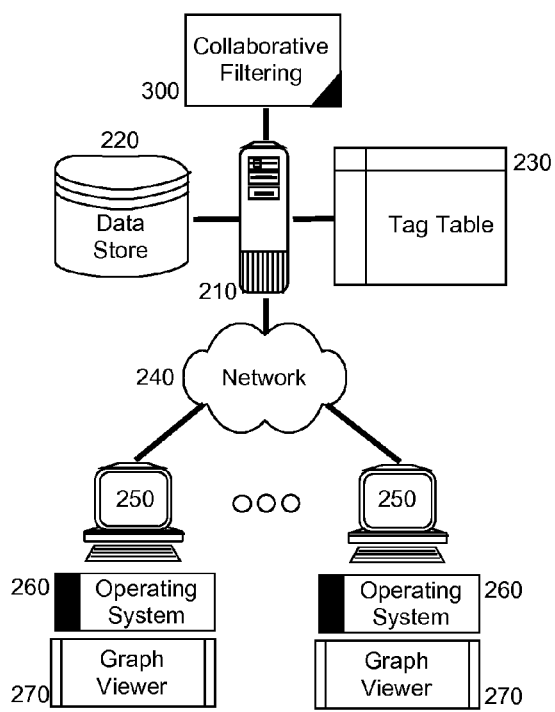
FIG. 2 is a schematic illustration of a graph filtering data processing system configured for collaborative filtering of a graph; and, FIG. 3 is a flow chart illustrating a process for collaborative filtering of a graph.

The process described in connection with FIG. 1 can be implemented within a graph filtering data processing system. In yet further illustration, FIG. 2 is a schematic illustration of a graph filtering data processing system configured for collaborative filtering. The system can include a host computing system 210 that includes one or more host servers coupled to a data store 220 and a table of tags applied to nodes of a graph representative of data in the data store 220. In this regard, each tag can be applied by a different end user to a corresponding node of the graph as an annotation of a respective rating of interest subjectively expressed by the end user. Likewise, an end user can remove a tag applied to a previously tagged node when browsing the graph in the graph viewer 270. In either circumstance, a composite rating thus can be maintained for each node as an aggregation of the ratings established for each node by multiple different end users.

The host computing system 210 can be communicatively coupled to different client computers 250 over computer communications network 240. Each of the client computers 250 can include an operating system 260 supporting the execution of a graph viewer 270. The graph viewer 270 can be configured to retrieve data from the central data store 220 and a graph representative of the retrieved data from the data store 220. The graph viewer 270 further can be configured to render for display in a corresponding one of the client computers 250 a portion of the retrieved graph.

Notably, a collaborative filtering module 300 can be coupled to the data store 220 in the host computing system 210. The collaborative filtering module 300 can include program code that when executed in memory of the host computing system 210 can filter nodes from the graph according to composite ratings applied to the nodes of the graph. In this regard, a filter can be selected in the collaborative filtering module 300 such as filtering the graph for nodes according to the composite ratings applied to the nodes by corresponding tags in the tag table 230. For example, nodes can be filtered for inclusion in a subset for display by the graph viewer 270 to include only those nodes proximate to primary node of interest that are collaboratively and collectively deemed of higher interest than others of the nodes. The proximate nodes, for instance, can be selected according to a greedy algorithm. As another example, nodes can be filtered for inclusion in a subset for display by the graph viewer 270 to include only those nodes proximate to primary node of interest without any composite rating indicating nodes yet to be explored or sparsely explored by other end users.

In one aspect of the invention, nodes of the graph can be determined that have properties similar to a selected node of the subset to which an annotation has been applied, and the determined nodes can also have that annotation applied. In another aspect of the invention, nodes of the graph can be determined that are connected to a selected node to which an annotation has been applied. Thereafter, a rating for each of the determined nodes can be computed such that the computed rating for each of the determined nodes is inversely related to a distance of the each of the determined nodes from the selected node.

Figure 3:
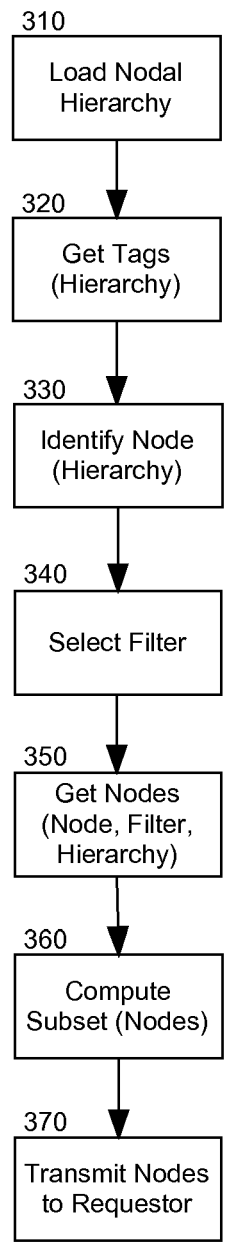

In even yet further illustration of the operation of the collaborative filtering module, FIG. 3 is a flow chart illustrating a process for collaborative filtering during visualization of a graph. Beginning in block 310, a graph can be loaded for a data set in a repository. In block 320, different tags for the graph can be retrieved, each tag indicating a previously applied rating by a particular end user for a specific node at an earlier point in time. In this way, a composite rating can be computed for each node for which one or more tags have been applied as an aggregation of the applied tags. Thereafter, in block 330 a node can be identified amongst the nodes and in block 340 a filter can be selected to filter nodes from the graph in block 350 according to the composite ratings applied to the nodes. For instance, one filter can select nodes proximate to a highly rated node according to a composite score applied to the highly rated node. In another instance, a filter can select nodes that are either unrated or of low rating indicating nodes that have been sparsely explored by other end users. In block 360, a subset of nodes in the graph can be computed according to the filtered nodes and in block 370, the subset can be transmitted to a client computer over a computer communications network for browsing by the end user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for collaborative filtering during retrieval of a graph comprising:
 loading a data set from a repository of data;
 representing the data set in a graph of a plurality of arranged nodes and links therebetween;
 identifying a primary node amongst the arranged nodes of the graph;

retrieving a composite rating for different ones of the arranged nodes, the composite rating for a corresponding one of the arranged nodes aggregating different ratings previously applied to the corresponding one of the arranged nodes by different end users;

selecting a subset of the arranged nodes based upon the identified primary node and a composite rating of one or more other nodes; and, transmitting to a computer over a computer communications network only the identified primary node and also the selected subset.

2. The method of claim 1, further comprising displaying the primary node and also the subset on a display of the computer.

3. The method of claim 1, wherein the subset is selected based upon one or more nodes amongst the subset having a composite rating indicative of high relevance to the different end users.

4. The method of claim 1, wherein the subset is selected based upon one or more nodes amongst the subset having a composite rating indicative of a previously underexplored portions of the arranged nodes.

5. The method of claim 1, wherein the subset is selected not based on the primary node but based upon a topmost number of nodes of a threshold composite rating in the graph, reconstructed into a new arrangement with each node in the new arrangement being interconnected according to a relationship from the graph for each note of the new arrangement.

6. The method of claim 1, wherein the subset comprises nodes related to the identified primary node and selected according to a greedy algorithm based upon a composite rating of one or more of the nodes.

7. The method of claim 1, further comprising annotating a selected node in the transmitted subset with a rating and updating a composite rating for the selected node in the graph.

8. The method of claim 7, further comprising:
determining all nodes of the graph with properties similar to a selected node of the subset that has been annotated with a rating; and,
updating a composite rating for the determined nodes in the graph.

9. The method of claim 7, further comprising:
determining all nodes in the graph connected to a selected node of the transmitted subset;
computing a rating for each of the determined nodes such that the computed rating for each of the determined nodes is inversely related to a distance of the each of the determined nodes from the selected node;
updating a composite rating for the determined nodes in the graph.

10. The method of claim 1, further comprising removing a previously applied rating from a selected node in the transmitted subset and updating a composite rating for the selected node in the graph.

* * * * *